United States Patent [19]

Ophey

[11] 4,110,033
[45] Aug. 29, 1978

[54] CONTROL SYSTEM FOR COPYING APPARATUS

[75] Inventor: Petrus J. M. Ophey, Grubbenvorst, Netherlands

[73] Assignee: Oce-van der Grinten N.V., Venlo, Netherlands

[21] Appl. No.: 761,284

[22] Filed: Jan. 21, 1977

[30] Foreign Application Priority Data

Jan. 30, 1976 [NL] Netherlands ..................... 7600943

[51] Int. Cl.² ............................................. G03G 21/00
[52] U.S. Cl. ........................................ 355/14; 355/16
[58] Field of Search ............................. 355/3 R, 14, 16

[56] References Cited

U.S. PATENT DOCUMENTS 3,912,390 10/1975 van Herten ..................... 355/16 X Primary Examiner—A. D. Pellinen
Attorney, Agent, or Firm—Albert C. Johnston

[57] ABSTRACT

An electrophotographic copying apparatus employing a moving endless photoconductive belt for image formation and image transfer is provided with a control system whereby images are formed on the belt at fixed locations relative to at least one marking on the belt, without need to make the belt precisely to a certain length or to provide more than a single marking which, if the belt is made endless by a seam, can be located near the seam to enable skipping of the seam in the imaging operations. The control system includes a detector for emitting a signal pulse upon being passed by a marking and two substantially identical partial circuits, each operable to emit control signals for activating or inactivating processing stations that together form a processing zone traversed by the belt, and a switching circuit for starting the operation of one of the partial circuits in response to the signal pulse while the other partial circuit is and continues operating to complete the processing of the last imaging belt portion that entered the processing zone before the emission of the signal pulse.

6 Claims, 5 Drawing Figures

CONTROL SYSTEM FOR COPYING APPARATUS

This invention relates to a control system for copying apparatus of a kind that comprises a moving photoconductive endless belt and a number of processing stations which together form a processing zone through which the belt passes and in which images of originals are formed on parts of the belt and subsequently are transferred to receiving sheets, which belt parts are fixed in location relative to at least one marking. More particularly, the invention relates to a control circuit of such an apparatus which emits control signals with which the processing stations can be made active or inactive in synchronization with the passage of the said belt parts through the processing zone.

Various principles can be applied for the switching on and off of the processing stations in electrophotographic apparatus provided with a photoconductive endless belt.

In principle, the simplest control system can be realized by the use of a seamless photoconductive endless belt, as with such a belt the various processing stations can be switched when starting a copying run, as is usual with electrophotographic apparatus employing a photoconductive drum. In the case of a machine using an endless belt, however, it generally will be preferred to employ, instead of a cam shaft, an electric pulse generator in combination with a counting device, which generator generates pulses with a frequency proportional to the speed of movement of the photoconductive belt. This is principle is an equivalent of the cam shaft. Examples of appartus employing such a control system are disclosed in U.S. Pat. Nos. 3,521,950 and 3,661,452.

It is obvious that with such a control system images formed successively will occur at various places on the photoconductive belt, so such a system can be typified as one having non-fixed image places. Such a control system is objectionable, first of all, in that it is extremely difficult to manufacture seamless photoconductive endless belt which have identical photoelectric properties over their full length; so the length of such a belt is limited unfavorably for the life of the belt. Moreover, it generally is undesirable in other respects that the image can be formed at any place on the belt, since certain parts of the belt deteriorate sooner than other parts with regard to their photoelectric properties, thus causing the average life of the belt to become even shorter. Among the belt parts which may deteriorate sooner in photoelectric properties are parts by which certain processing stations are switched on and parts which are kept in bent condition about a roller during a longer time, for instance over weekends.

It should be remarded that a system having non-fixed image placed can be employed with photoconductive belts made endless by a seam, if provisions are made to prevent formation of an image on the seam, for instance by skipping the seamed part of the belt in each belt cycle. In this way apparatus provided with longer belts can be controlled according to such a system, but the other disadvantages continue to exist undiminished.

Accordingly, in general, a control system having fixed image places is preferred, such for instance as described in the U.S. Pat. Nos. 3,606,532, 3,761,263 and 3,912,390. With such a system the belt is subdivided into a number of sections providing image places of equal length, the length of each image place consisting of an image length and a buffer length, and a marking is applied on the belt for each image place.

Since the length of the belt employed in the known systems having fixed image places must be equal to a whole number of image place lengths, the belt must be made precisely to a certain length. Moreover, the application of the markings requires an extra processing step, which must be carried out with much precision.

These are objectionable features, and it is a principal object of the present invention to provide a control system whereby they can be avoided without loss of the advantages of apparatus of the kind above mentioned in which the images are formed at fixed image places of the photoconductive endless belt.

According to the present invention, in an apparatus of the kind above mentioned, a detector installed beside the path of the belt emits a signal pulse upon being passed by a marking on the belt, and the control circuit comprises two partial circuits, each equivalent to the other and each for emitting the control signals above mentioned, and further comprises a switching circuit which, in response to said signal pulse, starts the emission of control signals from one of the partial circuits, while the emission of control signals from the other partial circuit is maintained until the last belt part which entered into the processing zone before the passing of the marking has entirely passed through this zone.

In this way it is achieved that the number of markings to be applied on the belt can be limited to one, and this marking may be applied at almost any place along the belt, without need for confining its location by narrow tolerances. In this control system, further, the length of the belt need not be determined exactly, for the image places are determined in relation to the marking. By switching over from the one partial circuit to the other partial circuit, the making of copies by the use of image places situated just ahead of the marking becomes independent of the making of copies by the use of image places situated just behind (after) the marking. Consequently, an extra length of belt may be present at the location of the marking. Moreover, any slip in the drive of the belt can be corrected at least once during each cycle (revolution) of the belt movement.

In the case of a photoconductive belt made endless by. at least one connecting seam, the belt is provided according to the invention with a marking ahead of each seam, so that a seam does not fall within a belt part that is used effectively for the formation of the image.

The above mentioned and other objects, features and advantages of the invention will become apparent from the following description and the accompanying drawings of an illustrative embodiment of the invention.

Figure 1:
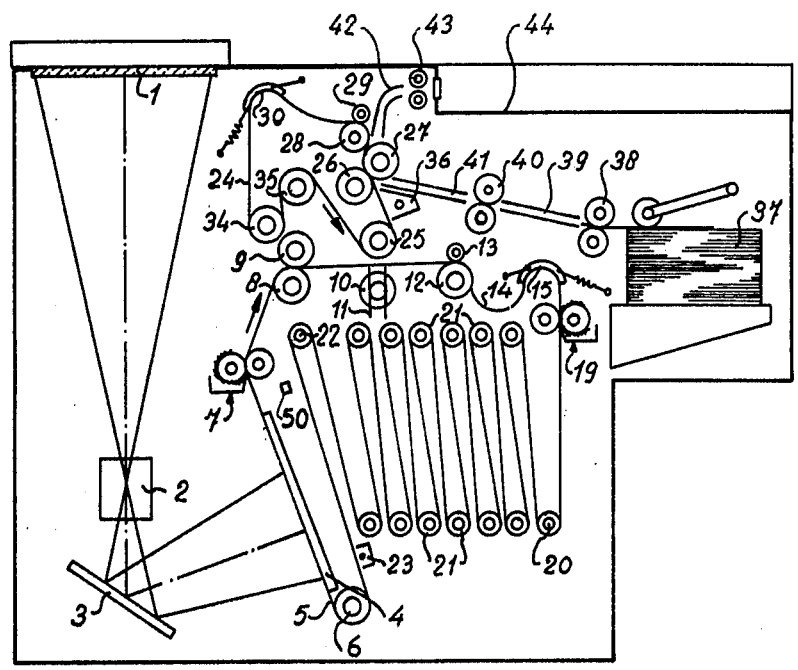
FIG. 1 is a schematic sectional view of an electrophotographic copying apparatus provided with a control system according to the invention.

Referring now more particularly to FIG. 1 of the drawings, the illustrative electrophotographic copying apparatus makes use of an endless belt 5 having a photoconductive layer formed on an electrically conductive layer, which belt, after uniform charging of the photoconductive layer by a corona device 23, is conveyed from a roller 6 along an exposure station at a suction box 4, where the belt is kept flat, though moving continuously while an electrostatic charge pattern is formed on the belt by imagewise discharging. For the imagewise discharging, an original lying on a glass exposure plate 1 is exposed by flash lamps (not shown), and the resulting light image is projected onto the belt 5 via a lens 2 and a mirror 3. By virtue of the flash exposure, the belt can move continuously while the original is standing still.

The belt part on which the electrostatic charge pattern, or latent image, is formed subsequently passes a developing station at developing device 7, where the latent image is converted into a powder image. The imaged belt part then passes to a drive roller 8 the outer surface of which has a high coefficient of friction relative to the belt, and which may coact with a pressure roller 9. Roller 8 drives the belt 5 continuously. The belt runs from roller 8 over a roller 10 which is movable along a guide 11 toward and away from the belt, so upward and downward as seen in FIG. 1, to press the belt when so desired against a receiver belt 24 which is guided about a roller 25 so that the powder image is picked up by the belt 24. Such a transfer system is described more particularly in Dutch patent application 75.02874 and a corresponding U.S. application Ser. No. 663,971 filed Mar. 4, 1976, now U.S. Pat. No. 4,068,937. Subsequently the belt 5 moves over a roller 12, which may be provided with a pressure roller 13, and from which a length of the belt hangs down in slack condition in a loop 14 extending to a stationary curved surface 15, which serves for aligning the belt, as described more particularly in U.S. Pat. No. 3,846,021.

The belt 5 then moves to a cleaning device 19 for removing residual powder, as generally known, and is then guided about a roller 20 to and over a number of reversing rollers 21, which together form a magazine for holding a great length of belt, after which the belt is conveyed over roller 22 to the roller 6 and thereby again passes the charging corona device 23.

The roller 25 works as a drive roller for the image receiving belt 24. This belt extends from roller 25 between the pairs of rollers 26, 27 and 28, 29 and thence in a relaxed portion to a stationary curved surface 30 which serves for aligning the belt 24 in the manner described in reference to surface 15. The belt 24 thus hangs down freely between the rollers 28, 29 and the surface 30, and from surface 30 it runs to a reversing roller 34, thence over roller 35 and from there back to drive roller 25.

A radiant heating device 36 facing the belt run from roller 25 to rollers 26, 27 heats the powder image that has been taken onto the belt 24 from the belt 5 at the interface of the rollers 10 and 25, thus rendering this powder image sticky so that it can be transferred easily from belt 24 to a copy paper. A sheet of copy paper is supplied from a pile 37 of this paper via rollers 38, guide 39, rollers 40 and guide 41 to the nip between belt 24 and roller 27. The paper sheet picks up the sticky powder image while being passed through that nip, and then the sheet is transported through guide 42 to rollers 43 which lay it down onto a copy table 44.

The photoconductive belt in the illustrated embodiment is formed by a finite belt that has been made endless by a seam joining its ends. The belt is provided at the location of the seam with a marking which can be detected by means of a detector 50 which may be, for example, a photoelectric scanning device. Whenever the marking on the belt passes the detector 50, the detector generates a signal pulse MRK (see FIG. 2) which is used as one of the input signals of the control circuit to be described below. The marking on the belt can be formed for instance by a perforation, or by a small square which has light-reflecting properties deviating from those of the belt. It is also possible to use according to the invention an endless seamless belt provided with a marking at any desired location.

The belt driving roller 8 is connected and rotates with a so-called pulse disc which forms part of a pulse generator, as described more particularly in U.S. Pat. No. 3,912,390. This generator generates CLOCK pulses having a frequency proportional to the speed of movement of the belt 5, which pulses are also used as external signals for the control circuit still to be described.

A third input signal, the signal RUN, for this circuit is generated by a copy selector which is composed of a selecting means by which the operator of the apparatus can set the number of copies to be made of the same original and a circuit which compares the set number of copies with the number of copies already made. A RUN signal is generated in the output of the selector circuit as long as at least one copy of an original is still to be made.

Figure 2:
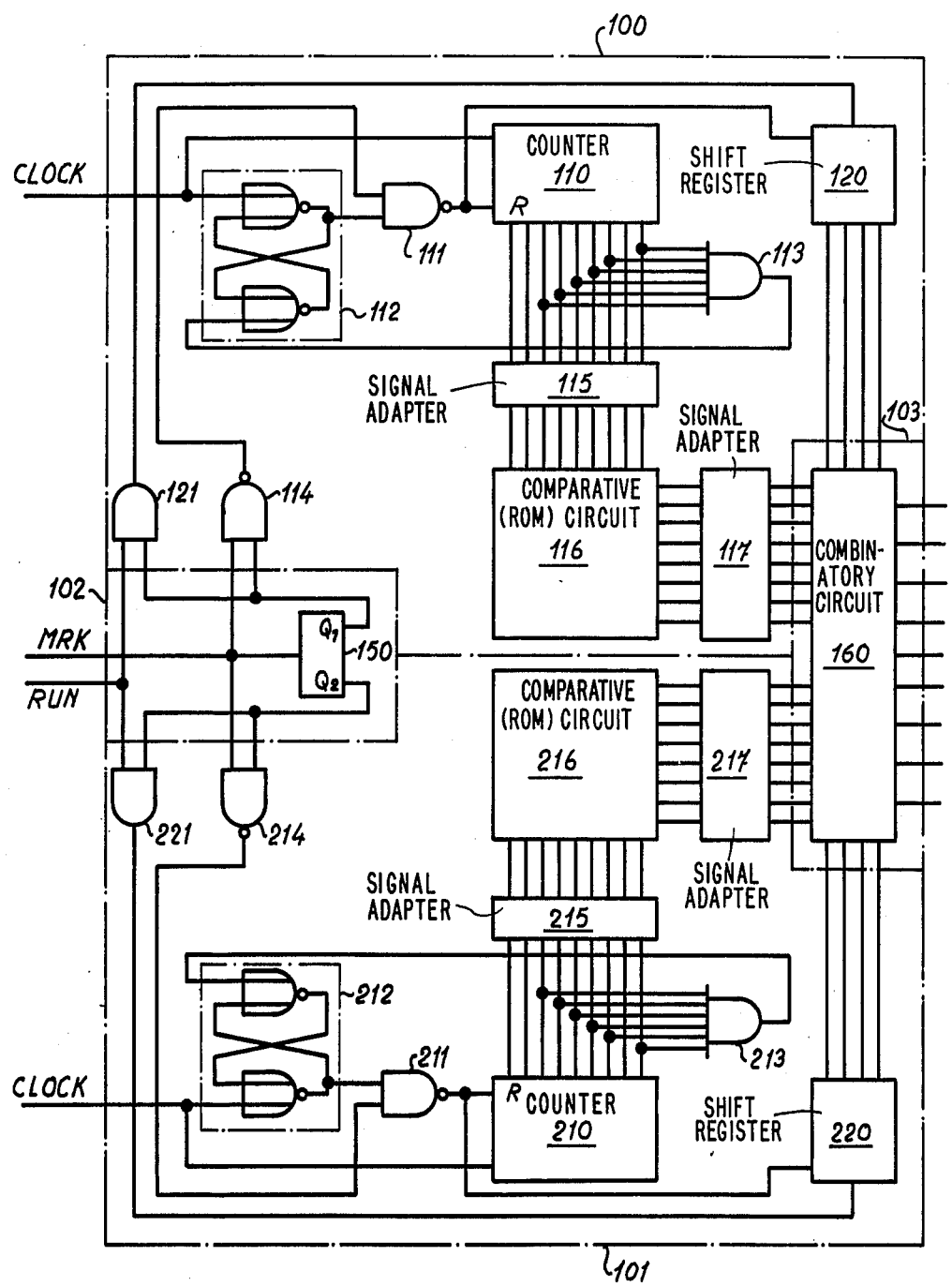
FIG. 2 is a diagram of circuit components of the control system.

The control circuit as represented in FIG. 2 is composed of two identical partial circuits 100 and 101, a reversing circuit 102 and an output circuit 103.

Each partial circuit 100 or 101 comprises a binary counter 110 respectively 210, the counting input of which is connected with the output of the above-described CLOCK pulse generator. In the illustrated embodiment each binary counter 110 or 210 has nine outputs, and the largest number which can be stored in this counter is equal to 512.

Each binary counter 110 or 210 has a reset input R which is connected with the output of a NAND-gate 111, respectively 211, having two inputs. The first input of the NAND-gate 111 or 211 is connected with the set output of an RS-flipflop 112, respectively 212. The set input of the flipflop 112 or 212 is connected with the output of an AND-gate 113, respectively 213, of which the inputs are connected with a number of outputs of the binary counter 110, respectively 210, in such manner that when the combination in the output of the counter 110, respectively 210, corresponds with a predetermined number, a signal is generated in the output of the gate 113, respectively 213, with which signal the flipflop 112 respectively 212 is set. In the illustrated embodiment the predetermined number is equal to 380. The reset input of the flipflop 112, respectively 212, is connected with the output of the pulse generator to receive the CLOCK pulses.

The second input of the NAND-gate 111 or 211 is connected with the output of a NAND-gate 114, respectively 214, having two inputs. The first input of the NAND-gate 114, respectively 214, is connected with the output of the detector 50, in which a signal pulse MRK is generated each time when a marking applied on the photoconductive belt 5 passes the detector. The second input of the NAND-gate 114, respectively 214, is connected with the first output Q1, respectively second output Q2, of a JK-flipflop 150, which essentially constitutes the reversing circuit 102. The input of the JK-flipflop 150 is connected with the output of the detector 50.

The respective outputs of the counters 110 and 210 are connected via a circuit 115, respectively 215, with a comparative circuit 116, respectively 216. The circuit 115, respectively 215, serves for adaptation of the signal levels in the outputs of the counter 110, respectively 210, to the comparative circuit 116, respectively 216. The comparative circuit 116, respectively 216, is a so-called ROM (Read-Only Memory), in which a number of predetermined numbers are stored. Illustrative values of these numbers will become clear from the description below. The operation is such that, each time when the number present in the counter 110, respectively 210, is equal to one of the numbers stored in the comparative circuit 116, respectively 216, a signal pulse is generated in one of the outputs of the comparative circuit 116, respectively 216. These outputs are connected with the output circuit 103 via an intermediate circuit 117, respectively 217, having the same function as the circuit 115, respectively 215.

Each partial circuit 100, respectively 101, further comprises a shift register 120, respectively 220, having four outputs which are connected with the output circuit 103. A clock input of the shift register 120, respectively 220, is connected with the output of the NAND-gate 111, respectively 211. An input called data-input of the shift register 120, respectively 220, is connected with the output of an AND-gate 121, respectively 221, having two inputs, the first of which is connected with the output of the copy selector, to receive the RUN signal, and the second of which is connected with the first output Q1, respectively second output Q2, of the flipflop 150.

The output circuit 103 comprises a combinatory circuit 160. By means of this circuit, at certain combinations of signals in the outputs of the shift register 120, respectively 220, and in the outputs of the comparative circuit 116, respectively 216, a signal or signal pulse is generated in one of the outputs of the circuit 160, by which signal or signal pulse the operation of a certain function of the electrophotographic copying apparatus can be started or stopped.

The operation of the circuit of FIG. 2 when making one copy is described below, based on the suppositions that the apparatus is reset, i.e., that the shift registers 120 and 220 are empty and the counters 110 and 210 show zero, and that upon the last signal pulse MRK the first output Q1 of the flipflop 150 has become one, and thus the second output Q2 has become zero.

When the print knob is pressed, the drive of the photoconductive belt is started, and consequently the clock pulses CLOCK are generated. At the same time a signal RUN appears, which together with the signal in the first output of the flipflop 150 results in a signal in the first output of the shift register 120, but not in the shift register 220 as the gate 221 is in blocking condition.

As soon as the binary counter 110 has reached the number "110", which number is also stored in the comparative circuit 116, signals are generated in the outputs of this circuit, which signals are combined in the combinatory circuit 160, together with the signal in the first output of the shift register 120, into a signal in the output of the combinatory circuit by which the belt charging corona device is started in operation. When reaching the number "200", which is also stored in the comparative circuit 116, the resulting signals are combined with the signal in the first output of the shift register 120 into a signal which switches on the feed current of the flash lamps. When reaching the number "360" in the counter 110, this has for consequence, in combination with the signal in the first output of the shift register 120, that the corona device is switched off. See the first section of the time-signal diagram of FIG. 3.

When the number "380" is reached, the flipflop 112 is reset via the gate 113, as a result of which the counter 110 is reset and at the same time the shift register 120 is shifted onward in such a way that now a signal is present in its second output. As in the meantime the signal RUN has dropped off, it having been assumed that only one copy was to be made, a signal will no longer appear in the first output of the shift register. The combination of the signal in the second output of the shift register 120 with the numbers "180", "190", and "340" supplies signals by which, respectively, as is indicated in the second diagram section of FIG. 3, the current for the flash lamps is switched off, the flash (exposure) lamp is ignited, and the developing function is switched on.

When subsequently the number "380" is formed again in the counter 110, this causes the counter 110 to be reset via the flipflop 112 and the gate 111, and the shift register is shifted onward so that a signal appears in its third output. At that moment no signals are present in the other outputs of the shift register 120, as the signal RUN is not present. When the number "210" in the counter 110 is reached, a signal is generated which, in combination with the signal in the third output of the shift register 120, generates a signal in the combinatory circuit, by which the developing device is switched off. See the third section of FIG. 3.

When the number "380" is reached again in the counter 110, the reset operation is repeated, while the shift register is shifted onward so that a signal appears in its fourth output. The combination of the numbers "10," "90," "260" and "340" in the counter 110 with the signal in the fourth output of the shift register generates signals in the outputs of the combinatory circuit, by which, respectively, as indicated in the fourth section of FIG. 3, the transfer station is switched on, the cleaning device is switched on, the transfer station is switched off and the cleaning function is switched off. When subsequently the counter 110 again reaches the number "380," the counter and the shift register are reset and thereby the belt is stopped, as the copy to be made is now completed and delivered onto the copy table.

Figure 4:
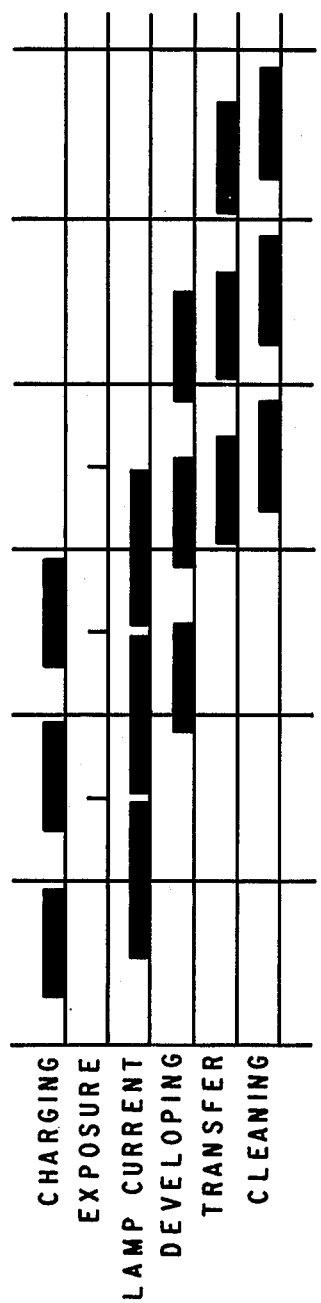
FIG. 4 is a diagram similar to that of FIG. 3, but now as signals occur when three copies are made.

In case more than one copy is to be made of an original, for instance three, the signal RUN keeps on existing until the third copy has started. It results that when the shift register 120 is shifted onward for the first time a signal again appears in its first output, so that now signals are present in its first and second outputs. When subsequently the signal reset is given once more, the shift register will make one more step, and as the signal RUN is still present, a signal will still be present in the first three outputs of the shift register 120. Now the signal RUN disappears. Time-signal relationships for the operations to make three copies are shown in the diagram of FIG. 4.

A special situation occurs when the detector signal MRK is generated during a copying run. This means that the seam of the photoconductive belt is near the point of entering into the imaging area. At the moment when this signal MRK is generated, the signal output of the flipflop 150 is inverted, as a result of which the gate 121 is blocked and the gate 221 is opened. If now a signal RUN is still present, the shift register 220 will be activated when the number "380" is reached, while the shift register 120 is shifted onward only once and consequently can serve only for completing the copy already started. The copies still to be made are then finished with the aid of the counter 210 and the shift register 220. Counter 210 and shift register 220 then cooperate with the gates 211, 212, 213 and 214, the circuits 215, 216 and 217, and the combinatory circuit 160, in the same way as the counter 110 and shift register 120 cooperate with gates 111, 112, 113 and 114, circuits 115, 116 and 117 and combinatory circuit 160.

At the same moment when the signal MRK is generated, the counter 210 is reset via gate 211 and the gate 214, the output of which temporarily becomes zero as long as the signal MRK is present, so that the remainder of the copying run for the copies still to be made can start immediately. Consequently in this case only a portion of the photoconductive belt in the immediate vicinity of the seam in the belt is skipped. At the moment when MRK is equal to one, the counter 110 controls processings in the first imaging area (for instance charging). The input of the shift register 120 now becomes zero, the input of the shift register 220 becomes one and the content of counter 210 becomes zero. As soon as the signal MRK is ended, the pulses CLOCK are counted by the counter 210. The input of the shift register 220 is taken over by the first output of this shift register only after counter 210 has reached the position 380. Only now can the counter 210 take over the control for the following copies from the counter 110. From this it follows that the detector 50 should be installed at a point of the belt path located one imaging area ahead of the first function or displaced from it by a whole number of imaging portions, and moreover, that the length of the belt should be equal to a whole number of imaging portions plus a small surplus length.

From the preceding it results that the images are always formed on the same places of the photoconductive belt. For as soon as the marking has been detected, a completely new control is brought into operation, as a result of which the image formation starts after a certain length of the belt has passed the detector, which belt length is determined by the numbers stored in the comparative circuits 116 and 216, respectively. Each succeeding image will occupy a fixed place on the belt relative to the preceding image. From this it follows that the belt can be subdivided longitudinally into a number of imaging portions, each of which consists of an image place length and a distance between two image places.

Figure 5:
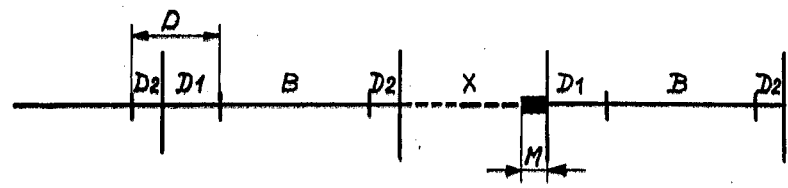
FIG. 5 schematically represents portions of the length of the belt at the location of a marking on the belt.
Figure 3:
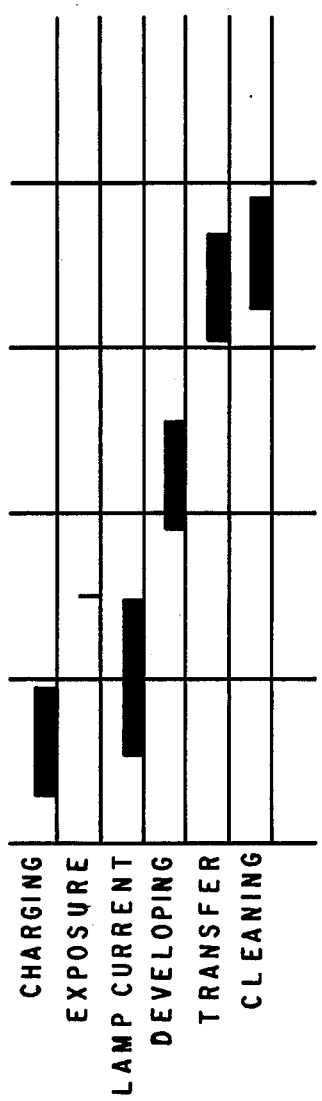
FIG. 3 is a time-signal diagram for the circuit according to FIG. 2, as signals occur when making one copy.

As is evident from FIG. 3 and schematically represented in FIG. 5, each imaging portion consists of a length D and an image place length B. The length D can be considered divided into a piece D2 situated behind the length B (seen in the direction of belt movement) and a piece D1 situated ahead of the length B.

As already stated, it in general is not practical to subdivide the belt longitudinally into a whole number of imaging portions; so the length of the belt is represented by the formula $n(B+D) + X$, wherein X is a piece smaller than B+D. This piece X, as represented in FIG. 5, lies between the marking M on the belt and the last imaging portion that will enter the processing zone ahead of the marking. The length X also represents the tolerance provided in the length of the belt.

Since the charging-up function of the first processing station for the imaging portion following the marking may not be started if the marking were to lie in that imaging portion, yet this function will have been started if the belt has covered a distance B+D relative to the preceding imaging portion, it follows that the distance X may amount at most to B+D, if the detector is situated at a distance ahead of the first processing station equal to a whole number of times the distance B+D. Consequently, the tolerance available in fixing the length of the belt amounts theoretically to the length B+D of an imaging portion of the belt.

What is claimed is:

1. In copying apparatus comprising an endless photoconductive belt movable through a number of processing stations which together form a processing zone in which images of originals are formed on portions of the belt and are subsequently transferred to receiving material, which belt portions have predetermined locations relative to at least one marking on said belt, and a control circuit which emits control signals for activating or inactivating said processing stations in synchronization with the movement of said belt portions through said zone, the combination which comprises a detector installed beside the path of said belt and operative to emit a signal pulse upon being passed by a said marking and a said control circuit which comprises two partial circuits, each equivalent to the other and each operable to emit such control signals, and a switching circuit operative in response to said signal pulse to start the operation of one of said partial circuits for the emission of such control signals while the other of said partial circuits is operating for the emission of such control signals so that said other partial circuit will continue so operating until the last of the said belt portions which entered into said processing zone before the emission of said signal pulse has passed entirely through said zone.

2. Apparatus according to claim 1, said photoconductive belt having been made endless by at least one seam therein and having a said marking thereon in the vicinity of each said seam.

3. Apparatus according to claim 1, and including a pulse generator which emits control pulses having a frequency proportional to the speed of movement of said belt and a copy selector comprising means for emitting a signal as long as a copy of a preselected number of copies remains to be made, each of said partial circuits being controlled via a first input thereof by said pulse generator and being connectable via a second input thereof with said signal emitting means, said switching circuit comprising a reversing circuit operative in response to said signal pulse to switch a connection with said signal emitting means alternately from said second input of one to said second input of the other of said partial circuits.

4. Apparatus according to claim 3, each of said partial circuits comprising a repeating counter which counts said control pulses of said pulse generator and a shift register which cooperates with said counter and is shifted a step onward by each reset pulse of said counter, and means for producing said control signals according to the output conditions of said counter and said shift register.

5. Apparatus according to claim 1, said detector being located at a point of said belt path which, in the direction of movement of said belt, precedes said processing zone by a distance equal to a whole number multiple of the length of one of said belt portions.

6. In copying apparatus comprising an endless photoconductive belt movable through a number of processing stations which together form a processing zone in which images of originals are formed on portions of the belt and are subsequently transferred to receiving material, which belt portions have predetermined locations relative to at least one marking on said belt, and a control circuit which emits control signals for activating or inactivating said processing stations in synchronization with the movement of said belt portions through said zone, the combination which comprises a detector installed beside the path of said belt and operative to emit a signal pulse upon being passed by a said marking, said detector being located at a point of said belt path which, in the direction of movement of said belt, precedes said processing zone by a distance equal to a whole number multiple of the length of one of said belt portions, said photoconductive belt having been made endless by at least one seam therein and having a said marking thereon in the vicinity of each said seam, and a said control circuit which comprises two partial circuits, each equivalent to the other and each operable to emit such control signals, and a switching circuit operative in response to said signal pulse to start the operation of one of said partial circuits for the emission of such control signals so that said other partial circuit will continue so operating until the last of the said belt portions which entered into said processing zone before the emission of said signal pulse has passed entirely through said zone, said combination including a pulse generator which emits control pulses having a frequency proportional to the speed of movement of said belt and a copy selector comprising means for emitting a signal as long as a copy of a preselected number of copies remains to be made, each of said partial circuits being controlled via a first input thereof by said pulse generator and being connectable via a second input thereof with said signal emitting means, said switching circuit comprising a reversing circuit operative in response to said signal pulse to switch a connection with said signal emitting means alternately from said second input of one to said second input of the other of said partial circuits, each of said partial circuits comprising a repeating counter which counts said control pulses of said pulse generator and a shift register which cooperates with said counter and is shifted a step onward by each reset pulse of said counter, and means for producing said control signals according to the output conditions of said counter and said shift register.

* * * * *